(12) United States Patent
Jesse (10) Patent No.: US 8,584,827 B1
(45) Date of Patent: Nov. 19, 2013

(54) SWING HOPPER MOVER INCLUDING MEANS TO LIFT THE SAME TO A TRANSPORT POSITION

(71) Applicant: Lynn Jesse, Urbandale, IA (US)

(72) Inventor: Lynn Jesse, Urbandale, IA (US)

( * ) Notice: Subject to any disclaimer, the term of this patent is extended or adjusted under 35 U.S.C. 154(b) by 0 days.

(21) Appl. No.: 13/659,326

(22) Filed: Oct. 24, 2012

Related U.S. Application Data (63) Continuation-in-part of application No. 13/199,976, filed on Sep. 14, 2011, now Pat. No. 8,365,896, which is a continuation-in-part of application No. 12/930,537, filed on Jan. 10, 2011, now Pat. No. 8,118,151, application No. 13/659,325, which is a continuation-in-part of application No. 13/544,195, filed on Jul. 9, 2012.

(51) Int. Cl.
*B65G 21/00* (2006.01)

(52) U.S. Cl.
USPC .......................................... 198/315; 198/320

(58) Field of Classification Search
USPC ......... 198/300, 302, 311, 312, 313, 315, 320, 198/666; 414/326, 525; 180/16, 19.1; 280/767
See application file for complete search history.

(56) References Cited

U.S. PATENT DOCUMENTS

| | | | | |
|---|---|---|---|---|
| 4,351,428 A | | 9/1982 | Long | |
| 4,351,429 A | * | 9/1982 | Garvey | 198/690.2 |
| 4,359,117 A | * | 11/1982 | Vaughan | 180/11 |
| 4,603,775 A | * | 8/1986 | Plett | 198/589 |
| 4,714,149 A | * | 12/1987 | Tiede | 198/312 |
| 4,963,066 A | * | 10/1990 | Boppart | 414/376 |
| 7,191,869 B1 | * | 3/2007 | Denison | 182/49 |
| 7,191,889 B1 | | 3/2007 | Heley | |
| 7,708,131 B2 | * | 5/2010 | Muth | 198/315 |
| 8,118,151 B1 | * | 2/2012 | Jesse | 198/315 |
| 8,365,896 B2 | * | 2/2013 | Jesse | 198/315 |

OTHER PUBLICATIONS

Brandt Agricultural Products, Ltd., PO Box 317, Station Main, 13th Ave and Pinkie Road, Regina, SK, Canada S4P 3A1; brochure—6 pages (date unknown), http://www.brandt.ca/divisions/agriculturalproducts/products/.

* cited by examiner

*Primary Examiner* — James R Bidwell
(74) *Attorney, Agent, or Firm* — Dennis L. Thomte; Thomte Patent Law Office LLC (57) ABSTRACT

A grain auger mover assembly is disclosed which may be used to move and raise a swing hopper auger associated therewith. The grain auger mover of this invention is remotely controlled.

9 Claims, 6 Drawing Sheets

FIG. 6

SWING HOPPER MOVER INCLUDING MEANS TO LIFT THE SAME TO A TRANSPORT POSITION

CROSS-REFERENCE TO RELATED APPLICATION

This application is a continuation-in-part application of Applicant's earlier application Ser. No. 13/199, 976, filed Sep. 14, 2011 entitled A CONVEYOR MOVER, which is a continuation-in-part application of application Ser. No. 12/930,537, filed on Jan. 10, 2011, now U.S. Pat. No. 8,118, 151 issued on Feb. 21, 2012 entitled GRAIN AUGER MOVER. This application is also a continuation-in-part application of application Ser. No. 13/544,195 filed Jul. 9, 2012 entitled SWING HOPPER FOR A GRAIN AUGER.

BACKGROUND OF THE INVENTION

1. Field of the Invention

This invention relates to a remotely controlled mover which is attached to the swing hopper auger tube of a grain auger so that the swing hopper may be moved with respect to the main auger tube of the grain auger. The mover may also be used to raise the swing hopper to a transport position and to lower the swing hopper from the transport position to a ground engaging position.

2. Description of the Related Art

A type of grain auger commonly used to auger grain is referred to as a swing or truck hopper grain auger or simply a swing auger. The conventional swing augers normally include a wheel-supported main auger having upper and lower ends. A ground engaging swing hopper assembly is operatively pivotally connected to the main auger so that the swing hopper may be selectively pivotally moved with respect to the main auger so that the swing hopper may be operatively positioned with respect to a grain truck or the like. The swing hoppers are very heavy and are difficult to manually move and to lift to a transport position.

Although movers have been previously provided for moving swing hoppers, it is not believed that movers have been previously provided which may also be used to move the swing hopper with respect to the main auger and also raise the swing hopper for transport. It is also believed that the prior art swing augers are generally raised for transport by a winch either operated manually or by hydraulic motors that are connected to a tractor-hydraulic system. The later arrangement requires that a tractor be running to power the hydraulic system.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An apparatus is disclosed for moving and lifting a wheeled swing hopper which is secured to a swing hopper auger tube which is pivotally attached to the main auger tube of a grain auger. The main auger tube has an elongated first and second elongated supports, having inner and outer ends, which extend outwardly therefrom. The first support has spaced-apart first and second sheaves mounted thereon with the second support having spaced-apart third and fourth sheaves mounted thereon. The apparatus of this invention includes an upstanding frame having first and second ends, an upper end, a lower end, a first side and a second side. The upper end of the upstanding frame is operatively secured to the swing auger tube. An elongated first axle is rotatably mounted at the first end of the upstanding frame which extends outwardly from the first side thereof. A first wheel is mounted on the first axle for rotation therewith. An elongated second axle is mounted at the second end of the upstanding frame which extends outwardly from the first side thereof. A second wheel is rotatably mounted on the second axle.

A battery operated and remotely controlled reversible motor is mounted on the upstanding frame which selectively drives the first axle or the first wheel in a first direction and in an opposite second direction. The second wheel is operatively interconnected to the first axle or the first wheel whereby the second wheel will be rotated with the first wheel. An elongated third axle is rotatably mounted on the first end of the upstanding frame at the second side thereof which is parallel to the first axle. The reversible motor also drives the third axle. A spool is mounted on the third axle for rotation therewith.

An elongated cable having first and second ends is provided. The first end of the second cable is secured to or wrapped around the spool. The cable extends through a guide sheave assembly thence upwardly therefrom, thence around the first sheave, thence around the second sheave, thence around the third sheave, thence around the fourth sheave, and thence downwardly to the swing hopper. The second end of the cable is connected to the swing hopper.

The motor is capable of pivotally moving the swing hopper to a position adjacent the main auger tube. When the swing hopper is positioned adjacent the main auger tube, the rotation of the spool, by the motor, in a first direction causes the cable to be wound upon the spool to lift the swing hopper to a transport position above the ground. When the swing hopper is positioned in the transport position, the rotation of the spool by the motor, in a second direction causes the cable to be unwound from the spool to lower the swing hopper to the ground.

It is therefore a principal object of the invention to provide an improved swing auger mover that is capable of raising or lifting the swing auger for transport and is easy and safe to use.

A further object of the invention is to provide an apparatus for moving and lifting a wheeled swing hopper through the use of a battery operated and remotely controlled motor.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional grain auger having a main auger tube 12 supported on wheels 14 and 16. Wheels 14 and 16 are operatively connected to the main auger tube 12 by an adjustable framework 18 so that the upper end of the main auger tube 12 may be raised or lowered in conventional fashion. Auger tube 12 has a lower end 20 and an upper discharge end 22. A conventional main auger is rotatably contained or positioned within the main auger tube 12 for conveying or augering material such as grain therein from the lower end 20 to the upper discharge end 22 in conventional fashion.

The numeral 24 refers to a swing auger tube having an upper discharge end 26 and a lower intake end 28. A swing auger of conventional design is rotatably contained or positioned within swing auger tube 24 for conveying material from the lower intake end 28 to the upper discharge end 26 and into the main auger tube 12 in conventional fashion.

The numeral 30 refers to a swing hopper having an inner end 32, an outer end 34 and an open upper end 36. Swing hopper 30 is supported by a pair of wheels 38 at its inner end and a pair of wheels 40 at its outer end. The inner end of swing hopper 30 is pivotally connected to the intake end 28 of swing hopper tube 24 by a vertical axis 42 and a horizontal axis 44. As described in the co-pending application, Ser. No. 13/544, 195, filed on Jul. 9, 2012, the disclosure of which is relied upon to complete the disclosure if necessary. One or more conventional augers are positioned within hopper 30 for conveying grain therein to the inner end 32 thereof and into the intake end 28 of swing auger tube 24. The upper end of swing auger tube 24 is connected to the main auger tube 12 by a swivel joint 46 in conventional fashion.

Figure 1:
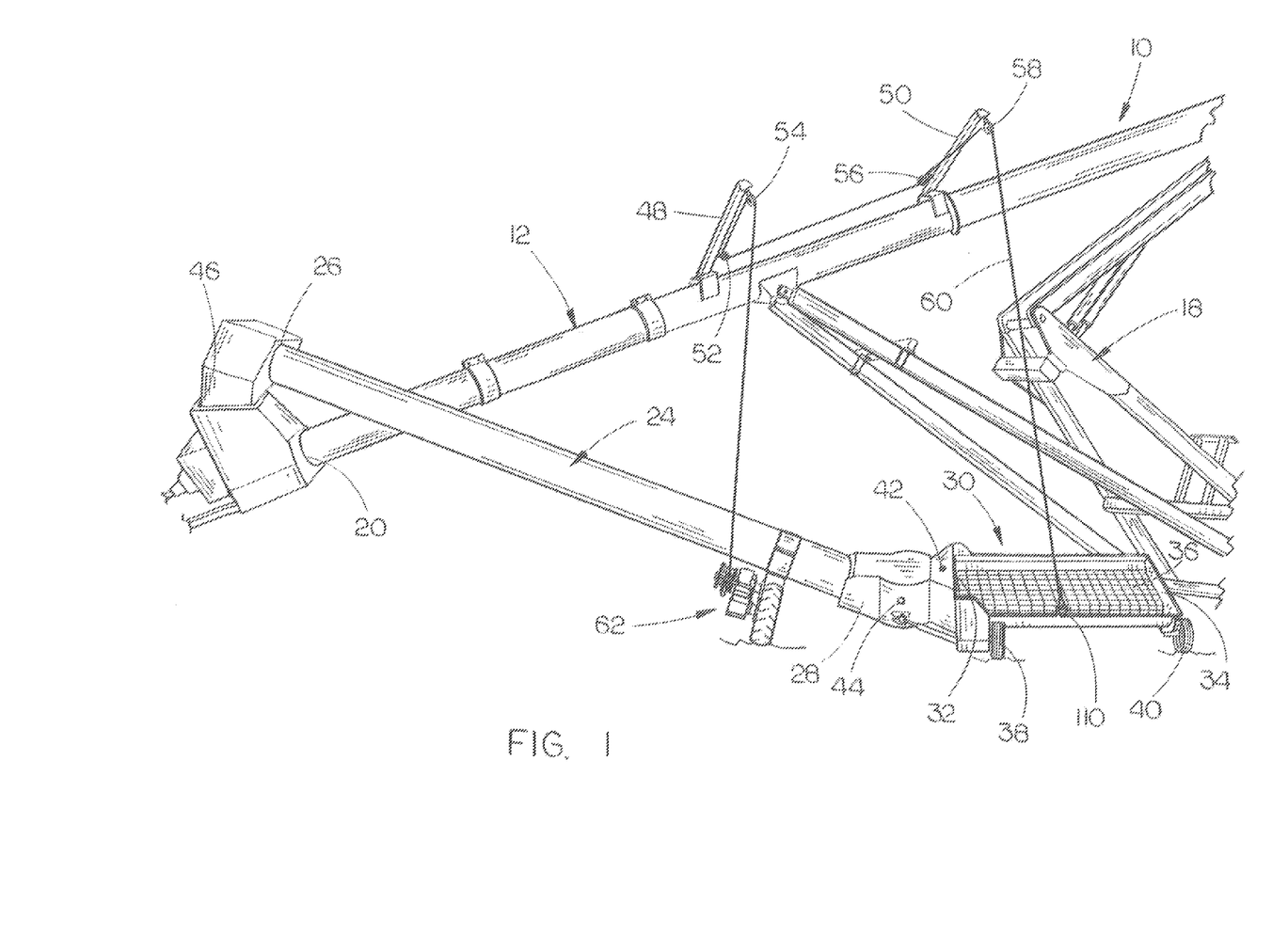
FIG. 1 is a partial perspective view of a grain auger having a swing hopper secured thereto by an auger tube and which illustrates the moving and lifting apparatus of this invention attached to the swing auger tube.

Many of the conventional grain augers which include a manually operated winch to raise and lower the swing hopper thereof for transport have a pair of supports 48 and 50 which are secured to the main auger tube 12 and which extend outwardly therefrom, as seen in FIG. 1. As seen in FIG. 1, support 48 has a pair of rotatable sheaves 52 and 54 mounted thereon and support 50 has a pair of rotatable sheaves 56 and 58 mounted thereon. The numeral 60 refers to a cable or strap which is associated with the supports and sheaves. It is to this conventional structure that Applicant's combination mover and lifter apparatus of this invention is employed, as will now be described.

Figure 5:
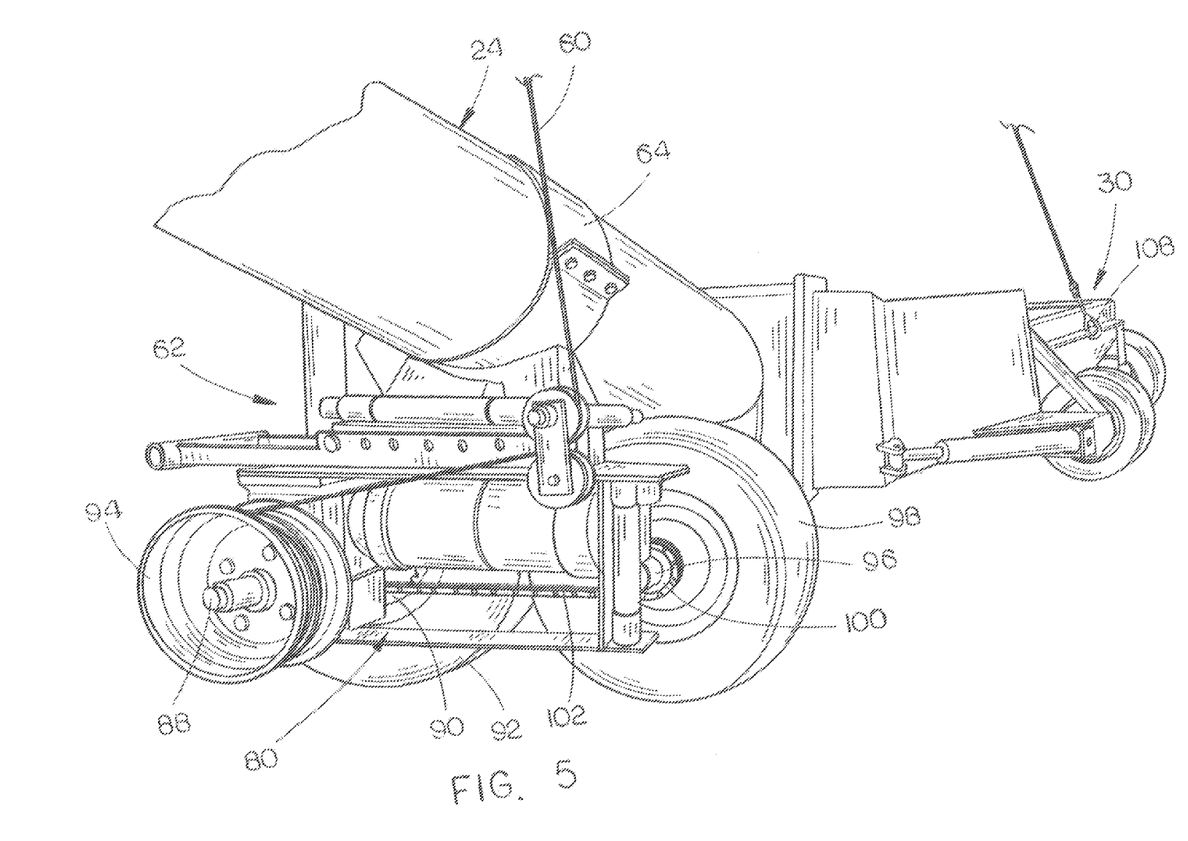
FIG. 5 is a further perspective view of the moving and lifting apparatus of this invention.
Figure 6:
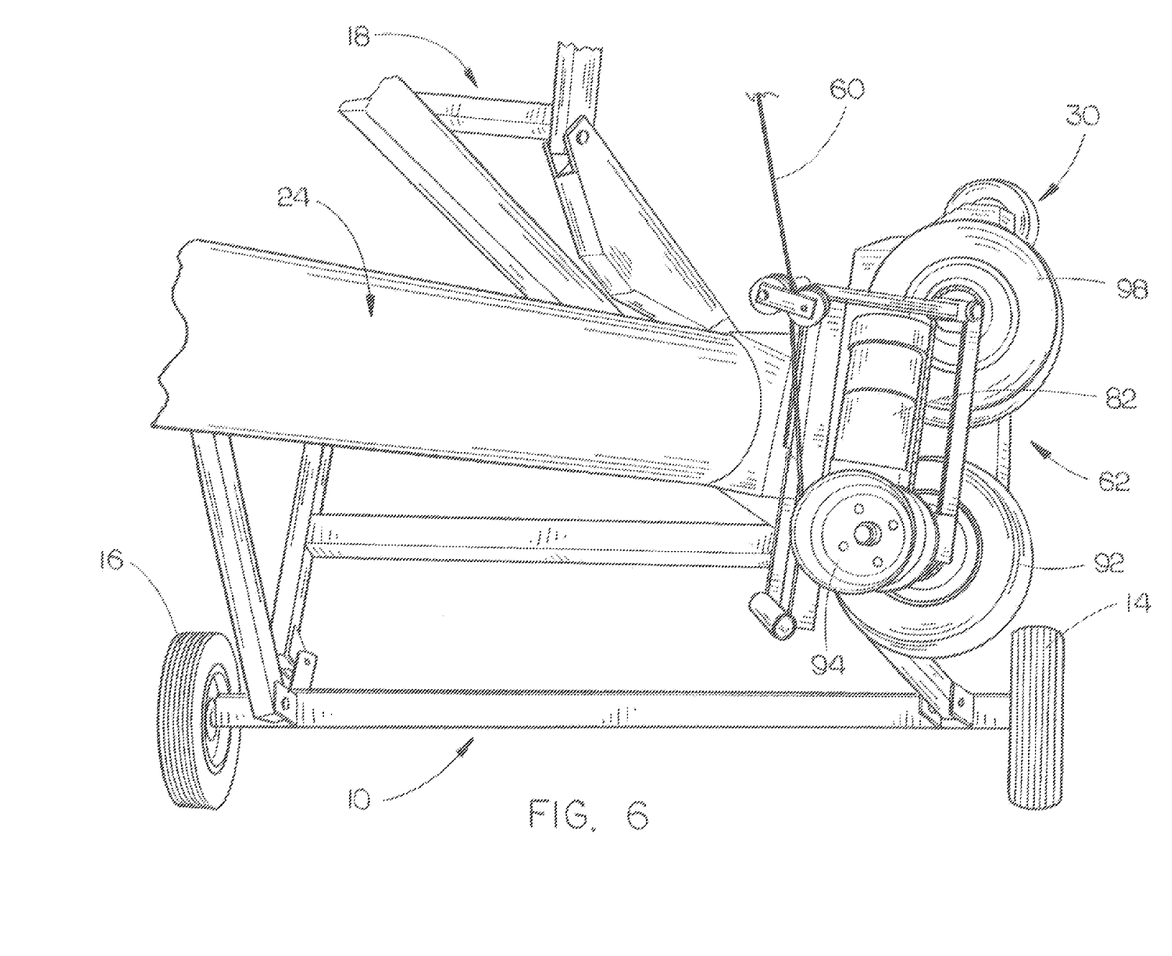
FIG. 6 is a perspective view illustrating the moving and lifting apparatus of this invention in an elevated transport position.

The combination swing hopper mover and lifter is referred to generally by the reference numeral 62. The combination swing hopper mover and lifter apparatus 62 is clamped to the swing auger tube 24 by a clamp 64, as seen in FIG. 5. Clamp 64 includes a support 66 which extends downwardly therefrom. A horizontally disposed collar or sleeve 68 is secured to the lower end of support 66. The apparatus 62 includes a generally horizontally disposed support 70 which has spaced-apart collars 72 and 74 secured to the upper end thereof. Collars 72 and 74 receive the collar 68 therebetween. A pivot pin 76 extends through collars 72, 68 and 74 to pivotally connect the support 70 to the support 66.

A jack 78, such as described in application Ser. No. 13/199, 976, has its upper end and its lower end operatively secured to the clamp 64 to pivotally move support 70 upwardly or downwardly with respect to support 66.

Figure 3:
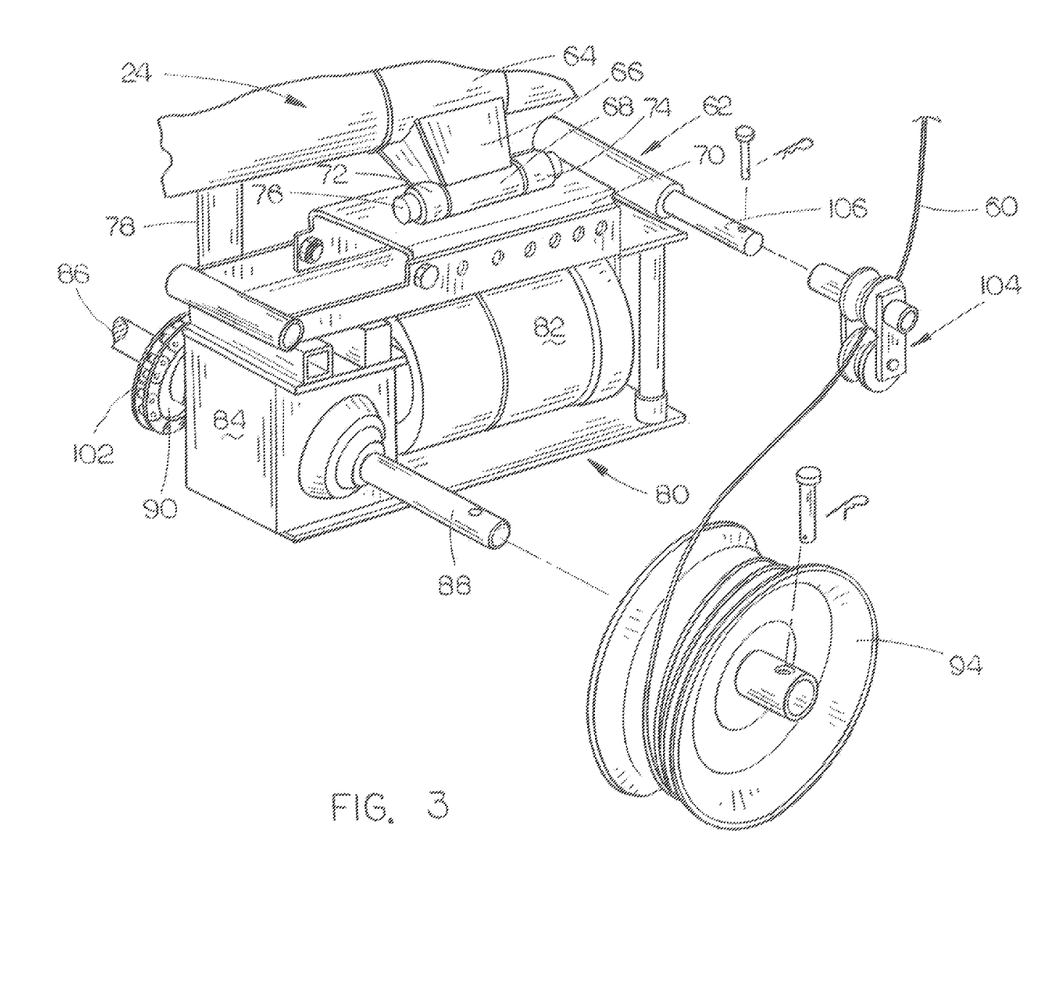
FIG. 3 is a partial perspective view illustrating the moving and lifting apparatus of this invention.
Figure 4:
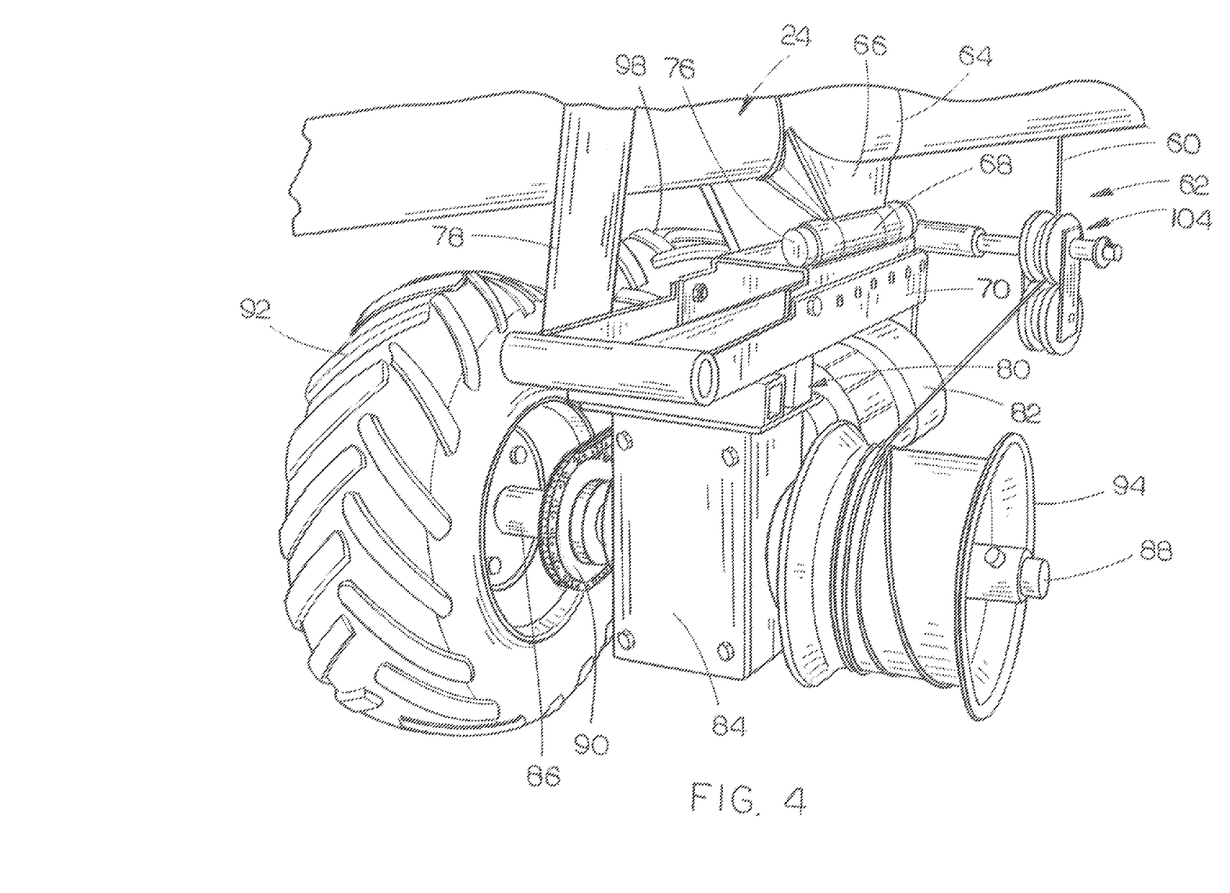
FIG. 4 is a perspective view of the moving and lifting apparatus of this invention.

A support structure 80 extends downwardly from support 70 and has a remotely controlled or battery operated motor 82 mounted thereon which is connected to a gear box 84 having a wheel drive shaft 86 extending from one side thereof and a spool drive shaft 88 extending from the other side thereof, as seen in FIG. 3. The drive motor 82 is a reversible motor so as to be able to rotate shafts 86 and 88 in a first direction and a second opposite direction. The drive motor could also be a hydraulic motor. A sprocket 90 is secured to shaft 86 for rotation therewith. A wheel 92 is mounted on shaft 86 for rotation therewith. A spool 94 is mounted on shaft 88 for rotation therewith. An idler shaft 96 extends horizontally from the structure 80 and has a wheel 98 mounted thereon. A sprocket 100 is rotatably mounted on shaft 96. Sprocket 100 is coupled to a wheel 96 by chain 102 so that rotation of sprocket 100 causes rotation of wheel 98. Chain 102 interconnects sprockets 90 and 100 so that rotation of shaft 86 and wheel 92 causes shaft 96, sprocket 100 and wheel 98 to be rotated.

A guide sheave assembly 104 is selectively mounted on a support shaft 106 which extends laterally from support 70 as seen in FIG. 3. The numeral 108 refers to an elongated cable or strap having opposite ends. One end of cable 108 is selectively secured to swing hopper 30 at 110. Cable 60 extends upwardly from hopper 30 and passes around sheaves 58 and 56. Cable 60 extends from sheave 56 and extends around sheave 52 and then around sheave 54. One end of cable 60 is secured to swing hopper 30 at 108. The other end of cable 60 may be wrapped around spool 94 when it is desired to move the mower apparatus 62 to a transport position as will be described in more detail hereinafter.

In normal operation, the motor 82, which is battery operated, may be radio controlled or hard wired to a controller. The mover 62 may be operated to move the swing hopper 30 into a position beneath a hopper bottom truck or the like. Rotation of the motor 82 in a first direction causes the drive wheel 92 and the wheel 98 to be moved in a first direction so that the swing hopper 30 moves away from the main auger tube 12. Rotation of the motor 82 in a reverse direction causes the drive wheel 92 and the wheel 98 to be moved in an opposite direction to the first direction to cause the swing hopper 30 to be moved towards the main auger tube 12.

In use, the upper end of the auger 10 will sit on the roof of a grain bin to discharge grain into the grain bin. When it is desired to move the auger 10 to a different bin, the swing hopper is moved to a position closely adjacent the main auger through the use of the mover 62. The cable spool 94 is then slipped onto the shaft 88, if not already done so. The free end of the cable 60 is secured to the spool 94. The spool 94 is then rotated by hand until the cable 60 is taut. The spool 94 is then pinned to the shaft 88 for rotation therewith.

Figure 2:
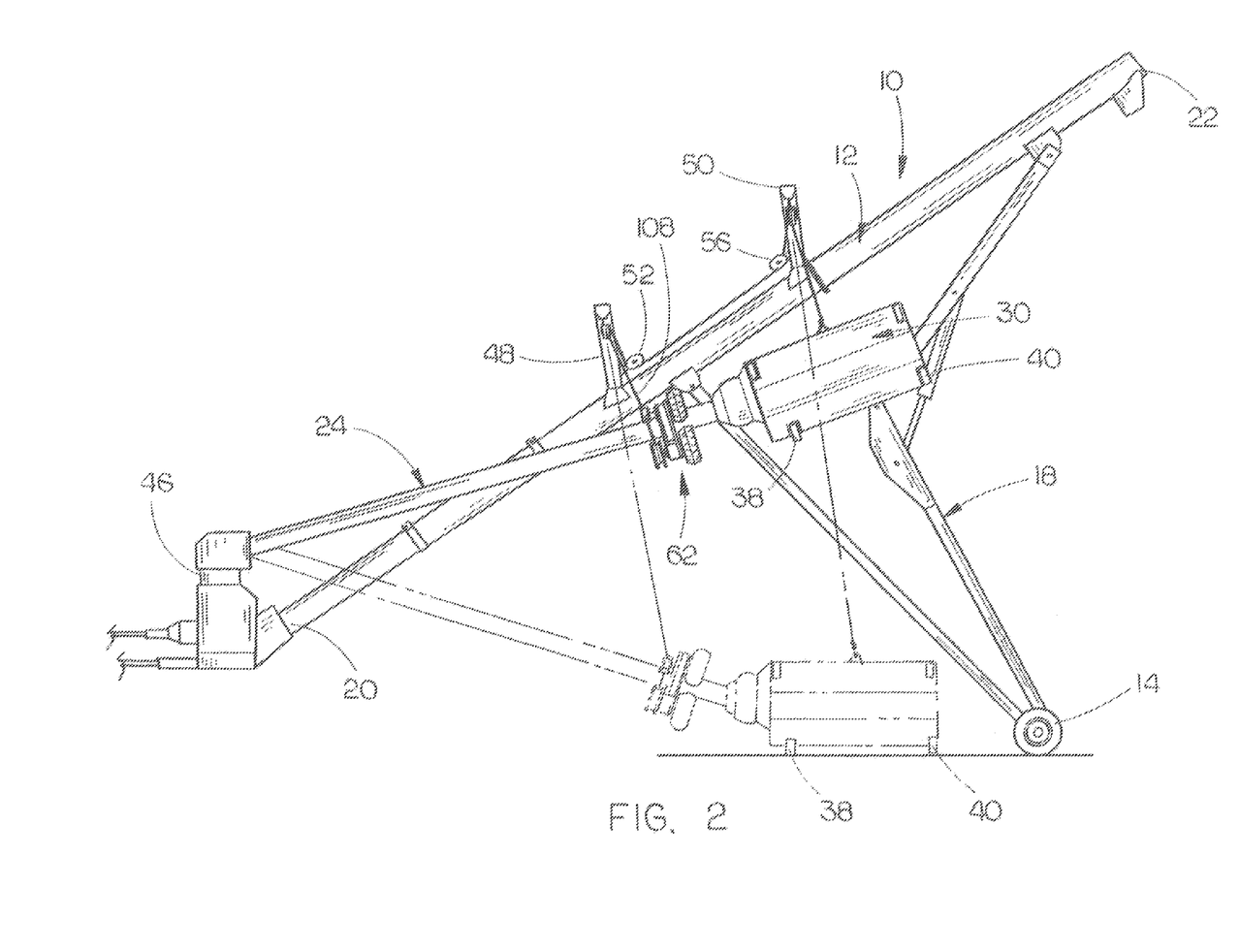
FIG. 2 is a side view illustrating the swing hopper in an elevated transport position with the broken lines illustrating the swing hopper in a ground engaging position.

The auger 10 is then raised off the bin roof enough so that the wheels 92 and 98 on the mover 62 are off the ground enough to lose traction. The motor 82 will then be activated which causes the wheels 92 and 98 to be rotated. The activation of the motor 82 at this time also causes the shaft 88 and spool 94 to be rotated which causes the cable 60 to be wound upon the spool. The winding of the cable 60 onto the spool 94 causes the swing hopper 30 to be raised from the broken line position of FIG. 2 to the solid line position of FIG. 2. The auger 10 will then be moved away from the grain bin. The auger 10 will then be lowered to a transport position so that the auger 10 may be safely moved to another bin. When the auger 10 has been moved to another bin, the auger 10 is raised so that the discharge end of the auger 10 may be placed on the upper end of the grain bin.

The motor 82 is activated in a reverse direction which causes the cable 60 to be unwound from the spool 94 which causes the swing hopper 30 to be lowered to the ground. The cable 60 is then disconnected from the swing hopper 30 and the cable 60 is disconnected from the spool 94. The motor 82 may then be used to pivotally move the swing hopper 30 to be moved to a desired position.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An apparatus for moving and lifting a wheeled grain auger swing hopper secured to a swing upper auger tube which is pivotally attached to a main auger tube, having upper and lower ends, the main auger tube having an elongated first and second supports, having inner and outer ends, which extend outwardly therefrom, with the first support having spaced-apart first and second sheaves mounted thereon and with the second support having spaced-apart third and fourth sheaves mounted thereon; comprising,
    an upstanding frame having first and second ends, an upper end, a lower end, a first side and a second side;
    said upper end of said upstanding frame being secured to said swing auger tube;
    an elongated first axle rotatably mounted at said first end of said upstanding frame which extends outwardly from said first side of said upstanding frame towards the swing hopper;
    a first wheel mounted on said first axle for rotation therewith;
    an elongated second axle mounted at said second end of said upstanding frame which extends outwardly from said first side of said upstanding frame towards the swing hopper;
    a second wheel rotatably mounted on said second axle;
    a remotely controlled reversible motor mounted on said upstanding frame which selectively drives said first axle or said first wheel in a first direction and an opposite second direction;
    said second wheel being operatively interconnected to said first axle or said first wheel whereby said second wheel will be rotated with said first wheel;
    an elongated third axle rotatably mounted at said first end of said upstanding frame which is parallel to said first axle;
    said reversible motor also driving said third axle;
    a spool mounted on said third axle for rotation therewith;
    an elongated cable having first and second ends;
    said first end of said cable being wrapped around said spool;
    said cable extending upwardly from said spool, thence around the first sheave, thence around the second sheave, thence around the third sheave, thence around the fourth sheave, thence downwardly to the swing hopper;
    said second end of said cable being connected to the swing hopper;
    said motor being capable of pivotally moving the swing hopper to a position adjacent the main auger tube of the grain auger so that when in that position, the rotation of said spool, by said motor in the first direction causing the cable to be wound upon said spool to lift the swing hopper to a transport position above the ground and so that when the swing hopper is in the transport position, the rotation of said motor in the second direction causes the cable to be unwound from said spool to lower the swing hopper to the ground.

2. The apparatus of claim 1 wherein said motor is a battery operated electric motor.

3. The apparatus of claim 1 wherein said motor is a hydraulic motor.

4. An apparatus for moving and lifting a wheeled grain auger swing hopper secured to a swing hopper auger tube which is pivotally attached to a main auger tube, the main auger tube having a cable support structure thereon, comprising:
    a drive wheel support structure attached to the swing auger tube;
    first and second wheels mounted on said drive wheel structure;
    a remotely controlled reversible motor mounted on said drive wheel support structure;
    said motor being operatively connected to at least one of said first and second wheels to enable the swing hopper to be pivotally moved with respect to the main auger tube;
    a rotatable auxiliary drive shaft extending from said drive wheel support;
    a cable spool mounted on said auxiliary drive shaft for rotation therewith;
    an elongated flexible cable having first and second ends;
    said first end of said cable being connected to said cable spool;
    said cable extending upwardly from said cable spool, thence over the cable support structure on the main auger tube, thence downwardly to the swing hopper;
    said second end of said cable being connected to the swing hopper;
    said motor being capable of pivotally moving the swing hopper to a position adjacent the main auger tube of the grain auger so that when in that position, the rotation of said cable spool in a first direction causes the cable to be wound upon said cable spool to lift that swing hopper to an elevated transport position and so that when the swing hopper is in the transport position, the rotation of said motor in a second direction causes the cable to be unwound from said cable spool to lower the swing hopper to the ground.

5. The apparatus of claim 4 wherein said motor is a battery operated electric motor.

6. The apparatus of claim 4 wherein said motor is a hydraulic motor.

7. An apparatus for moving and lifting a wheeled grain auger swing hopper secured to a swing hopper auger tube which is pivotally attached to a main auger tube, the main auger tube having a cable support structure thereon, comprising:

a drive wheel support structure attached to the swing auger tube;

a drive wheel rotatably mounted on said drive wheel structure;

a cable spool rotatably mounted on said drive wheel support structure;

a remotely controlled reversible motor mounted on said drive wheel support structure;

said motor being operatively connected to said drive wheel to enable the swing hopper to be pivotally moved with respect to the main auger tube;

said motor being operatively connected to said cable spool to rotate said cable spool in first and second directions;

an elongated flexible cable having first and second ends;

said first end of said cable being connected to said cable spool;

said cable extending upwardly from said cable spool, thence over the cable support structure on the main auger tube thence downwardly to the swing hopper;

said second end of said cable being connected to the swing hopper;

said motor being capable of pivotally moving the swing hopper to a position adjacent the main auger tube of the grain auger so that when in that position, the rotation of said cable spool in said first direction causes the cable to be wound upon said cable spool to lift the swing hopper to an elevated transport position and so that when the swing hopper is in the transport position, the rotation of said motor in a second direction causes the cable to be unwound from said cable spool to lower the swing hopper to the ground.

8. The apparatus of claim 7 wherein said motor is a battery operated electric motor.

9. The apparatus of claim 7 wherein said motor is a hydraulic motor.

* * * * *